(12) United States Patent
Vasylyev

(10) Patent No.: US 6,728,412 B1
(45) Date of Patent: Apr. 27, 2004

(54) METHOD AND APPARATUS FOR ON-THE-FLY IMAGE CODING

(75) Inventor: Sergiy Viktorovich Vasylyev, Sacramento, CA (US)

(73) Assignee: S.V.V. Technology Innovations, Inc., Sacramento, CA (US)

( * ) Notice: Subject to any disclaimer, the term of this patent is extended or adjusted under 35 U.S.C. 154(b) by 645 days.

(21) Appl. No.: 09/699,157

(22) Filed: Oct. 26, 2000

Related U.S. Application Data

(60) Provisional application No. 60/162,710, filed on Oct. 29, 1999.

(51) Int. Cl.[7] ................................................. G06K 9/36
(52) U.S. Cl. ..................................................... 382/242
(58) Field of Search ............................... 382/197, 198, 382/218, 241, 242, 243, 245, 246; 375/240.25, 249; 348/409.1; 358/426.12, 426.13; 708/401, 402; 341/61, 63, 65, 67, 76

(56) References Cited

U.S. PATENT DOCUMENTS

| | | | |
|---|---|---|---|
| 3,833,900 A | * 9/1974 | Bahl et al. | .................... 341/65 |
| 3,921,204 A | * 11/1975 | Thompson | ............. 375/240.25 |
| 3,987,412 A | 10/1976 | Morrin | |
| 4,087,788 A | 5/1978 | Johannesson | |
| 4,156,880 A | * 5/1979 | Yamada | ..................... 358/3.29 |
| 4,307,377 A | 12/1981 | Pferd | |
| 4,360,840 A | * 11/1982 | Wolfrum et al. | ........ 358/426.12 |
| 4,606,069 A | * 8/1986 | Johnsen | ...................... 382/243 |
| 5,202,771 A | 4/1993 | Murayama | |
| 5,532,752 A | 7/1996 | Miyano | |
| 5,537,494 A | 7/1996 | Toh | |
| 5,898,799 A | 4/1999 | Murayama | |
| 6,295,546 B1 | * 9/2001 | Adiletta | ...................... 708/402 |

OTHER PUBLICATIONS

Vasilyev, Contour—Based Image Compression for Fast Real–Time Coding, ASP Conference Series, 1999, pp. 133–136, vol. 172, Astron. Soc. of the Pacific, USA.
Freeman, Computer Processing of Line Drawings, Computer Surveys, 1974, pp. 57–97, vol. 6, No. 1.
Standardization of Group 3 Facsimile Apparatus for Document Transmission, CCITT Recommendation T. 4, 1980, Geneva.

* cited by examiner

Primary Examiner—Jose L. Couso

(57) ABSTRACT

A method and apparatus for on-the-fly coding digital images using a line scanner, a boundary matcher/follower and a coder, and utilizing a small amount of processing and memory is disclosed. In an on-the-fly digital image coding method and apparatus feature points determining boundaries of regions of adjacent pixels of similar characteristics in each successive scanning line are sequentially detected and efficiently encoded in a chain-link manner, based on information concerned with feature points detected on a preceding scanning line. By this method, additional improvement in compression can be achieved with the use of predictive coding based on spatial stochastic correlation between successive feature points associated with a continuous boundary line. The image coding method of the invention allows a significant reduction of quantity of information needed for image representation without deterioration of image quality and with no requirement of intermediate storing vast amounts of image data at the time of coding.

20 Claims, 13 Drawing Sheets

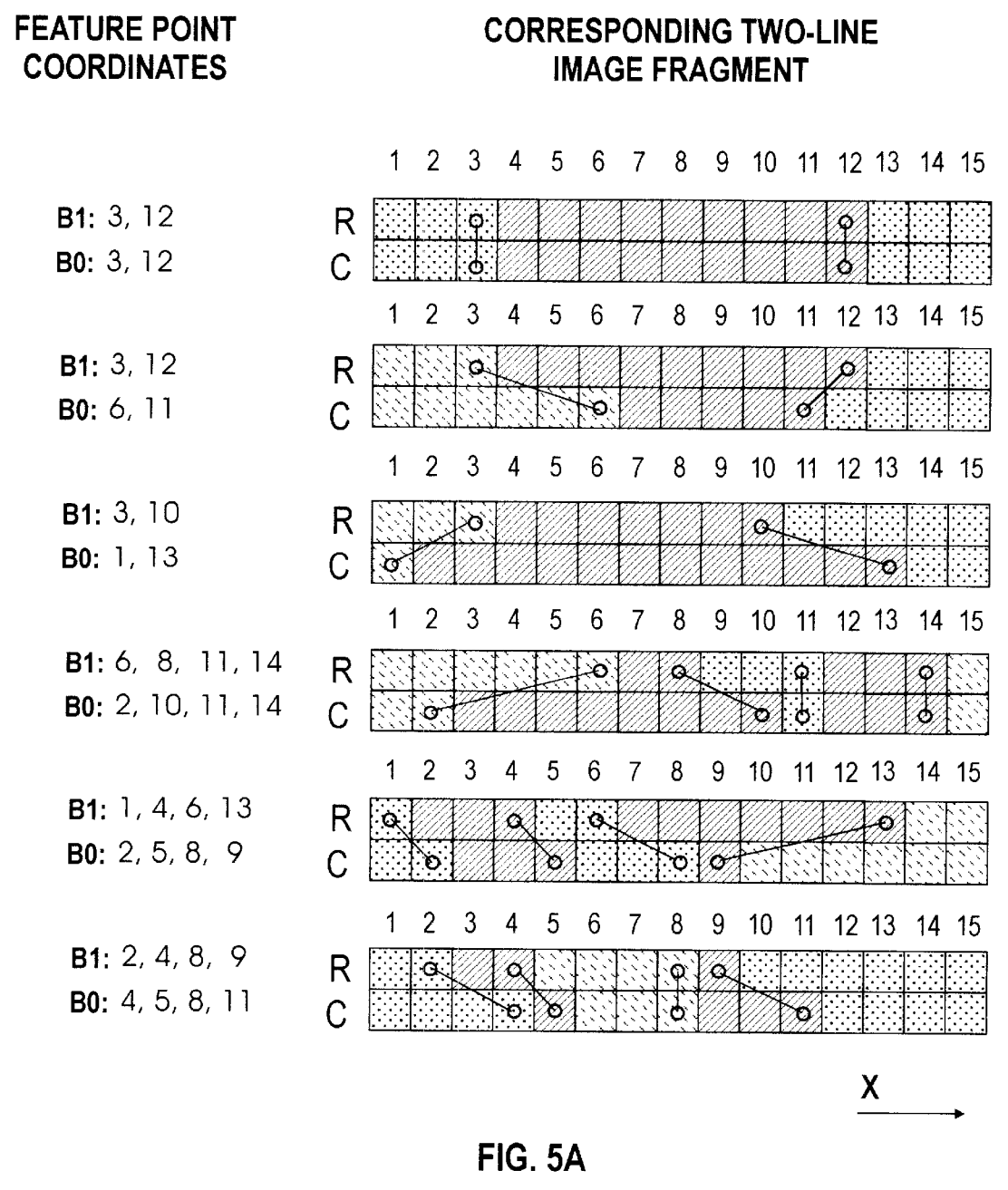

| FEATURE POINT COORDINATES | CORRESPONDING TWO-LINE IMAGE FRAGMENT |
|---|---|
| B1: 3, 12<br>B0: 3, 12 | |
| B1: 3, 12<br>B0: 6, 11 | |
| B1: 3, 10<br>B0: 1, 13 | |
| B1: 6, 8, 11, 14<br>B0: 2, 10, 11, 14 | |
| B1: 1, 4, 6, 13<br>B0: 2, 5, 8, 9 | |
| B1: 2, 4, 8, 9<br>B0: 4, 5, 8, 11 | |

FIG. 5A

| MATCHING FEATURE POINTS | VERTICAL CODEWORD |
|---|---|
|  P C | P(0) |
|  P C | PL1 |
|  P C | PL2 | small displacement

| | |
|---|---|
|  P C | PRL(4) |
|  P C | PLL(4) | large displacement

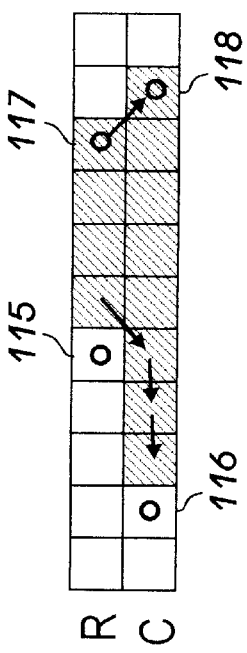
FIG. 10
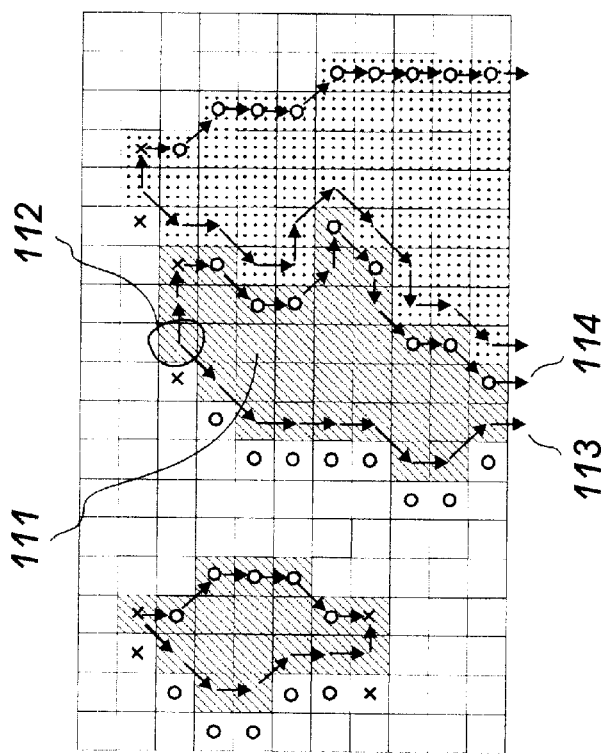
FIG. 11B
FIG. 11A

| PREVIOUS MOVE DIRECTION | CURRENT MOVE DIRECTION | SYMBOL CODE | DESCRIPTION | CODEWORD |
|---|---|---|---|---|
| →  | L(135) L(90) L(45)<br>BK ← → FW<br>R(135) R(90) R(45) | FW | FORWARD (PREDICTED MOVE) | 1 |
| | | L(45) | 45° LEFT | 01 |
| | | R(45) | 45° RIGHT | 001 |
| | | L(90) | 90° LEFT | 0001 |
| | | R(90) | 90° RIGHT | 00001 |
| | | L(135) | 135° LEFT | 000001 |
| | | R(135) | 135° RIGHT | 0000001 |
| | | BK | BACKWARD | 0000000 |

METHOD AND APPARATUS FOR ON-THE-FLY IMAGE CODING

This application claims benefit of 60/162,710 Oct. 29, 1999.

CROSS-REFERENCE TO RELATED APPLICATIONS

Not applicable.

BACKGROUND OF THE INVENTION

1. Field of the Invention

The present invention relates generally to an image coding method, and more particularly to a real-time image data compressing method in accordance with feature points detection to thereby encode an image signal with high efficiency, and also to an apparatus for the same.

2. Description of Prior Art

Digitized images require a notoriously large amount of storage space and bandwidth to store and transmit the image data. For example, a 24-bit color picture of an 8.5 inch by 11 inch page, at a modest resolution of 300 dots per inch, occupies as much as 25 megabytes of data. Video images are even more data intensive, requiring data handling and transmission rates of about a billion bits per second.

According to a typical conventional image compression method, information is coded to improve the efficiency of image transmission and storage so as to suppress information redundancy which is normally present in digital image data.

Various compression techniques are known for compressing digital data into compressed form. For instance, run-length encoding (RLE), Huffman coding, Lempel-Ziv-Welch (LZW), Shannon-Fano, and Discrete Cosine Transform (DCT) coding are all examples of compression techniques for compressing image data.

With respect to an original including a bi-level image, compression methods such as one-dimensional runlength image coding, e.g. Modified Huffman (MH), two-dimensional image coding methods, e.g. Modified READ (MR) and Modified Modified READ (MMR), and the Joint Bi-level Image Expert Group (JBIG) system using a hierarchical encoding function are known and have already been adapted to facsimile communication. MH scheme uses, as an information source, the number of successive pixels of the same level of the binary image signal. MR and MMR schemes exploit the difference between run changing points on a coding line and an immediately preceding line and encode bi-level images on the line-by-line basis. However, these coding schemes are not essentially suitable for compressing color imagery. On the other hand, color documents used in offices have gradually increased in number with the recent spread of full-color copying machines and printers of high image quality. In addition, a number of new applications have emerged which utilize the transmission of color image data through limited bandwidth data links.

For compressing a color image, the JPEG system has been accepted as a standard by the International Organization for Standardization (ISO) and Telecommunication Standardization Sector (TSS, former CCITT). However, JPEG and other existing techniques for compressing color imagery require a relatively significant amount of memory and data processing to compress and then decompress the data. Such processing requires a relatively lengthy time period, and therefore, the compression and decompression of the data can not be implemented in high data rate, real-time applications. In addition, these techniques do not fully exploit information redundancies found in most images. When lossy coding techniques, such as JPEG, are used, image quality deterioration tends to occur around the edges as the compression rate increases.

Region-based, or vector-based, image coding techniques have been proposed for still image compression based on the principle of segmentation of an image into a set of regions and encoding the resulting contours. Most efficient region encoding techniques utilize the so-called chain codes, which generally refer to 8-chain code representation for each region boundary pixel introduced in H. Freeman, "Computer Processing of Line Drawings", Computer Surveys, vol. 6 (1), pp. 57–97 (1974). Briefly, in a chain code method the raster image is scanned until a pixel, which is at the border of a region, is located. The surrounding pixels are then scanned in a predetermined order to determine the next border pixel and encode shift direction. This new pixel then becomes the current pixel and the operation of next border pixel determination is repeated until the last border pixel is found. At the end of encoding process, the compressed data are represented as a set of chain codes for each uniform pixel region in the image.

While existing chain code algorithms oftentimes allow for significant improvement in compression of noiseless images as compared to conventional block-based coding schemes, their main drawbacks are inherent complexity and high memory buffer requirements. Bypassing a contour of region usually implicates storing the full image or its significant part in memory, as well as repetitive random access to image elements across the image, making these methods infeasible for real time applications. Conventional techniques based on line by line contour tracing are limited to only bitonal, e.g., black and white, image representation.

The above techniques for compressing digitized images represent only a few of the techniques that have been devised. However, none of the known techniques yet achieves compression ratios and coding speed sufficient to support the huge still and video data storage and transmission requirements expected in the near future. In addition, for real time, high quality still and moving image transmission, none of the conventional compression and decompression algorithms is considered simple enough and commercially reasonable to be able to process very dense data inputs with minimum latency times.

Accordingly, there is an urgent need for a new image coding technique which achieves high compression ratios without sacrificing quality, and does so with a greatly reduced requirement for extensive computations.

BRIEF SUMMARY OF THE INVENTION

In accordance with the present invention, the above problems are solved by a method, or apparatus, for compressing an input data stream into compressed data by sequential detection of feature points representing object boundaries, simultaneous boundary following, and encoding the continuous feature points in a compact chain link form.

The present invention resides in the realization that an image can be represented by outline boundaries of regions containing pixels of similar characteristics and these boundaries can be detected on the fly as sets of continuous feature points and efficiently encoded in a chain-linked output code. As such, the invention enables input image data to be processed directly, line by line, and without the need to store the image or its significant fraction in memory and thus offers significant advantages in terms of processing and memory buffer requirements.

According to one aspect of the invention there is provided an image coding method in which an input image data is scanned, one line at a time, to detect continuous feature points on a scan line in the image and to represent the feature point displacements on adjacent scan lines as a function of detected displacements of previous feature points associated with the same boundary thereby to reduce the amount of data used to define the image.

According to another aspect of the invention there is provided an image coding apparatus comprising a line scanner for supplying digital image data and feature point detection, a boundary matcher/follower for associating continuous feature points on adjacent lines in the supplied image, memory buffers for temporal storage of feature point data, and a coder for chain link encoding the continuous feature point sequences, thereby to reduce the amount of data defining the image.

According to a further aspect of the invention, there is provided an image coding method in which continuous object boundaries are traced independently of each other on the line-by-line basis, however the information on nearby color transitions in the current and at least one adjacent line is used to check a boundary for continuity.

Furthermore, according to the invention, predictive coding can be used to encode continuous feature point sequences. Predictive coding is based on spatial stochastic correlation of feature points associated with a continuous boundary and assigning shorter code words to feature point displacements having lesser prediction errors.

Moreover, the invention provides a an image coding method and apparatus in which object boundaries constituting the image are encoded in chain linked sequences using positional information on feature point transitions along the boundary lines, while color information is stored only once for each object.

OBJECTS AND ADVANTAGES

An object of the present invention is to provide a novel and useful coding method for compressing and decompressing digital image data without requiring a significant amount of data processing or processing time, and to provide an apparatus for the same.

Another object in accordance with the method and apparatus of the invention is to enhance compression of image data exploiting its intrinsic redundancy and two-dimensional coding technique, and, consequently, the cost for use of the communication link is reduced.

The invention can be essentially useful and greatly superior over conventional techniques for coding images having relatively large areas of uniform luminance or color, for example, digital maps, line art, computer generated graphics, etc.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for the purpose of explanation and understanding only.

FIGS. 5A–5F are schematic diagrams illustrating, by way of example, the boundary matching principles.

FIG. 10 is a schematic diagram showing an example of boundary storage according to the third embodiment.

FIG. 11A is a schematic diagram illustrating, by way of example, image boundary tracing in accordance with the third embodiment.

FIG. 11B is a schematic diagram illustrating, by way of example, line-by-line generation of elementary moves along the object boundaries.

DETAILED DESCRIPTION OF THE PREFERRED EMBODIMENTS

In image data encoding or compression as utilized in its present invention, it is considered that the object boundaries outlining two-dimensional regions of picture elements (pixels) having similar characteristics comprise all information on the image. Picture elements indicating transitions of a predetermined pixel characteristic in the image are considered feature points. All non-featured picture elements on the document, i.e. picture elements which are not associated with the boundaries defined by feature points, are considered unnecessary and are therefore deleted in the compressed data.

Figure 1A:
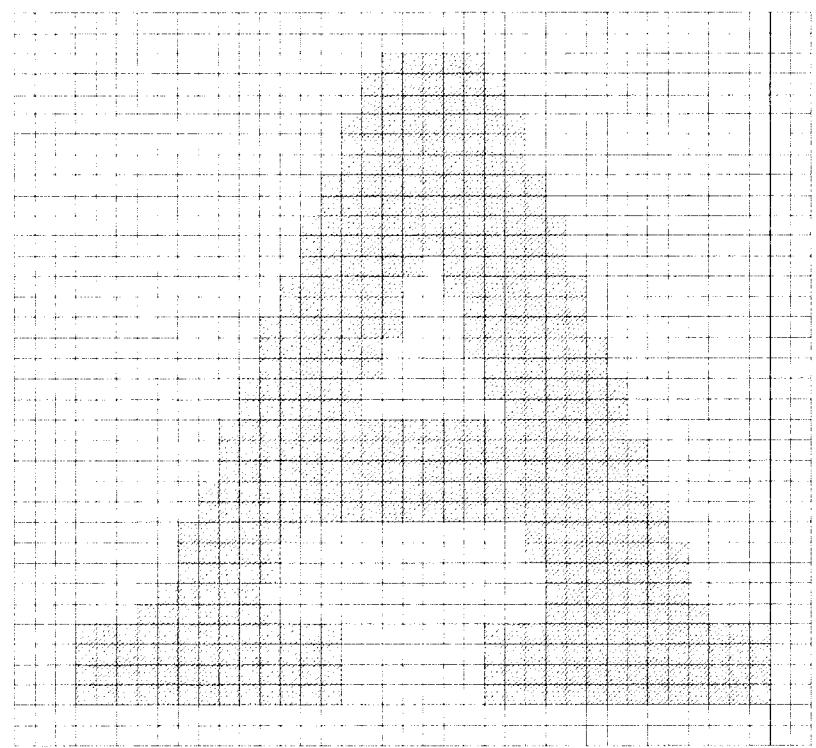
FIGS. 1A and 1B show an example of image representation using feature points which define closed object boundaries.
Figure 1B:
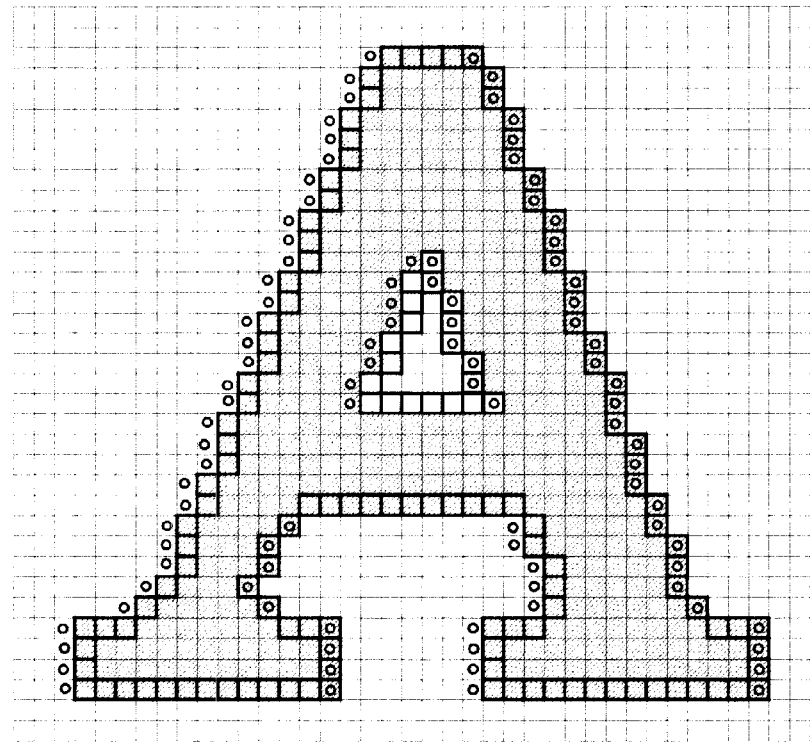

In the preferred invention embodiments, an input image is considered to be accessible as a line or a two-dimensional array of pixels. A cluster of pixels characterized by a same value, e.g., amplitude or color, is defined as a connected object if it possesses a single outer boundary closing upon itself. Accordingly, an input image is perceived as a set of connected objects of arbitrary shape and color which are selectively nested. FIG. 1A shows an image fragment containing the letter "A" (indicated by a hatching) included in a background picture signal. FIG. 1B explains how the letter "A" shown in FIG. 1A can be represented by an outer boundary representing its external outline and a nested boundary representing an embedded cluster of pixels of background color. The boundary pixels are indicated by bold squares. In turn, the boundaries can be fully determined and traced on the line-by-line basis using the feature points (marked with circles) detected independently for each scan line. In the preferred embodiments, a feature point is determined as a pixel immediately preceding the color-changing pixel (see FIG. 1B). Accordingly, a pair of adjacent feature points in a scan line explicitly defines a continuous run of pixels starting immediately after the first feature point of the pair and ending at the second feature point.

Figure 2:
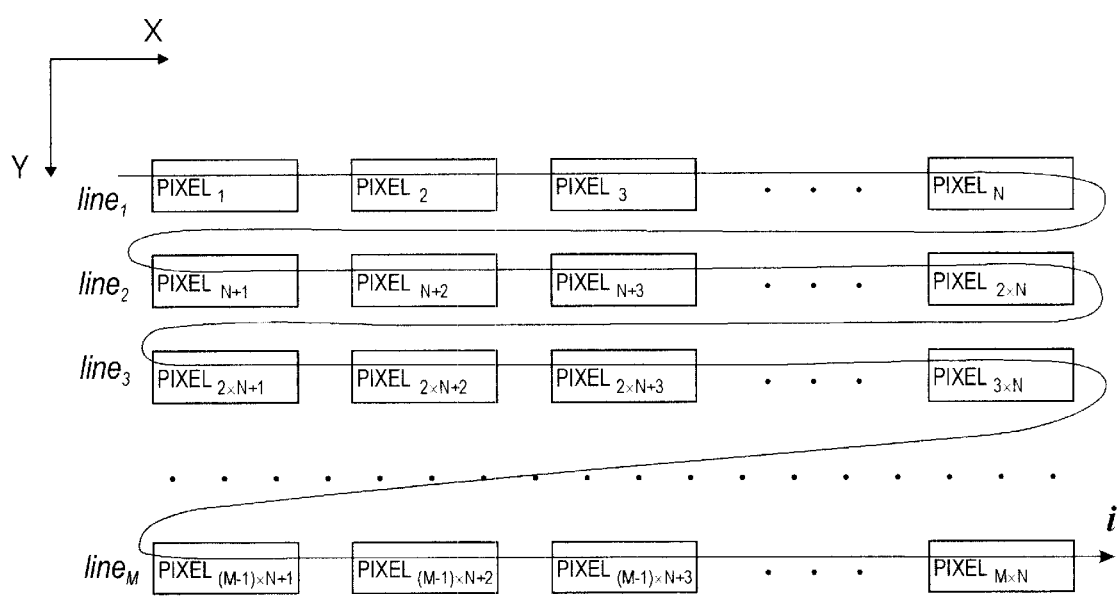
FIG. 2 is a schematic diagram illustrating an example of input data stream forming.

The input image data is considered a binary stream of values which represent individual pixels in successive lines of a raster scan of N pixels in width and M pixels in length (FIG. 2), so that all pixels can be consecutively referred to using number indexes i running from 1 to N×M or, alternatively, related using X and Y pixel position coordinates. A line to be coded is considered the current scan line, a first preceding line of the line to be coded is considered the reference scan line, and a second preceding line of the line to be coded is considered the previous reference scan line. The coordinate system is X-units left to right and Y-units top to bottom. In other words, Y coordinate represents the number of scan line, and X coordinate represents position of a pixel in this line.

According to the invention, any image can be encoded using a plurality of chain linked sets of feature points defining the color transitions between uniform-color runs of pixels on the consecutive scan lines. The method of the invention will sequentially encode boundaries of an arbitrary image in a chain link form, and form an output stream of bits utilizing a small amount of memory, without the need to store the entire image or its significant fraction in memory. It will encode continuous boundaries on the line by line basis by means of tracking the displacements of matching feature points between the adjacent scan lines and generating a differential code for the displacements as a function of the position and shift information on preceding feature points of corresponding boundaries. The method and apparatus in accordance with the invention provide improved data compression of image data associated with storage or transmission of an image.

First Embodiment

Figure 3:
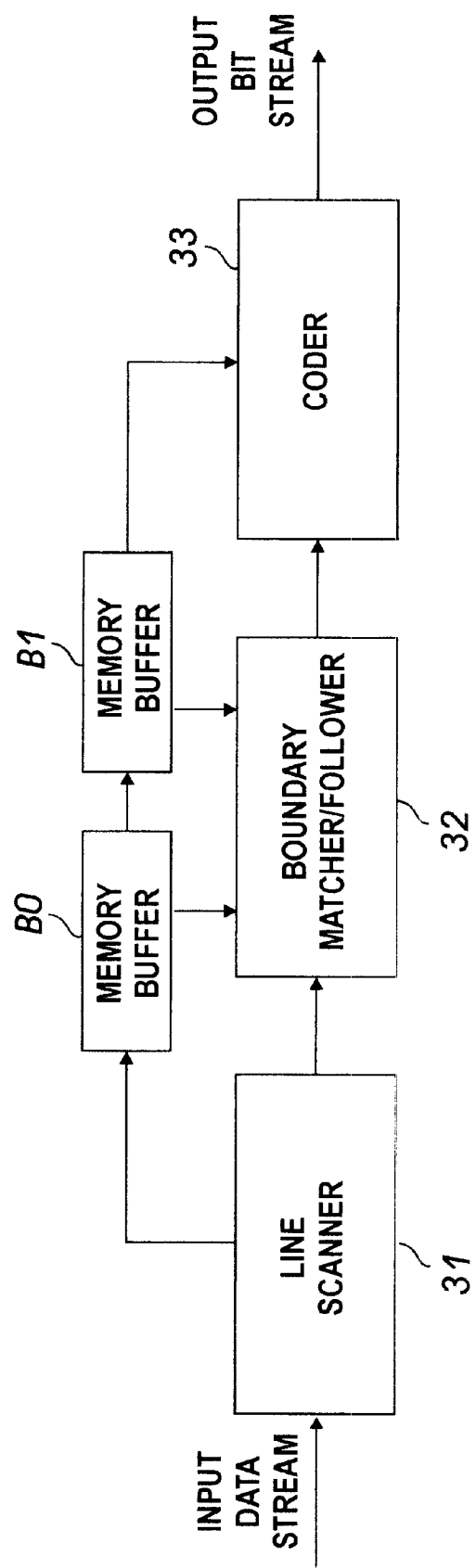
FIG. 3 is a flow diagram showing an overview of an embodiment of the image coding apparatus according to the present invention.

The first embodiment (see FIG. 3), in its most primitive form, consists of a line scanner 31, a boundary coordinate matcher/follower 32, two line memory buffers B0 and B1, and a coder 33. The line scanner 31 is considered to be a mechanism by which the image pixels are read sequentially, line by line, in row major order (left to right and top to bottom, see FIG. 2), and position and color values representing the pixels in the current scan line are returned and analyzed. The boundary matcher/follower 32 is considered to be a mechanism which associate continuous feature points encountered independently in adjacent scan lines and by which the boundaries are followed by moving from a feature point to the neighboring feature point in a given direction. The coder 33 is considered to be a mechanism by which the feature point positions in the current line are efficiently encoded in sequential manner using the corresponding feature point positions in the reference scan line and, if applicable, the pervious reference scan line.

The method comprises four main steps. These are (1) scanning the image line and detecting the feature points, (2) identifying the matching feature points, (3) connecting the matching feature points with a chain-link differential code, terminating ended feature point sequences or registering new sequences, and (4) reinitializing the buffers and counters and proceeding to the next line. The buffers B0 and B1 will store feature point coordinates X and color transitions for the current scan line and for the reference scan line, respectively. The color transition information is encoded as a codeword suffix indicating the color change at the detected feature point. In other words, the color change suffix indicates the color of a pixel following the transition edge. The color change suffix can indicate the color information directly or using a pointer to the corresponding color index in a predetermined color table.

The coding technique according to the first embodiment is described in the following sequence of operations.

1)

At START of the encoding, the memory buffers B0 and B1 are initialized to zero (i.e., containing no elements), and X coordinate is set to 0 (i.e., pointing to an imaginary pixel immediately preceding the first actual pixel of the image).

Then, the line scanner 31 scans sequentially the raster image line pixel by pixel, incrementing the X coordinate accordingly, until a color transition pixel is found, which X coordinate is decreased by one to obtain the corresponding feature point coordinate and stored in the buffer B0 together with the color change suffix. Then the image line is further scanned, until a next pixel terminating the current-color pixel sequence is found. The corresponding X-1 coordinate of transition pixel is also stored in the current line memory buffer B0 as a next feature point. The resulting value will correspond to the X coordinate of the last pixel in the continuous same-color pixel sequence. As each new color changing pixel is found, its X coordinate decreased by one is stored in the current line buffer B0, thus indicating a feature point on the current scan line.

Figure 4:
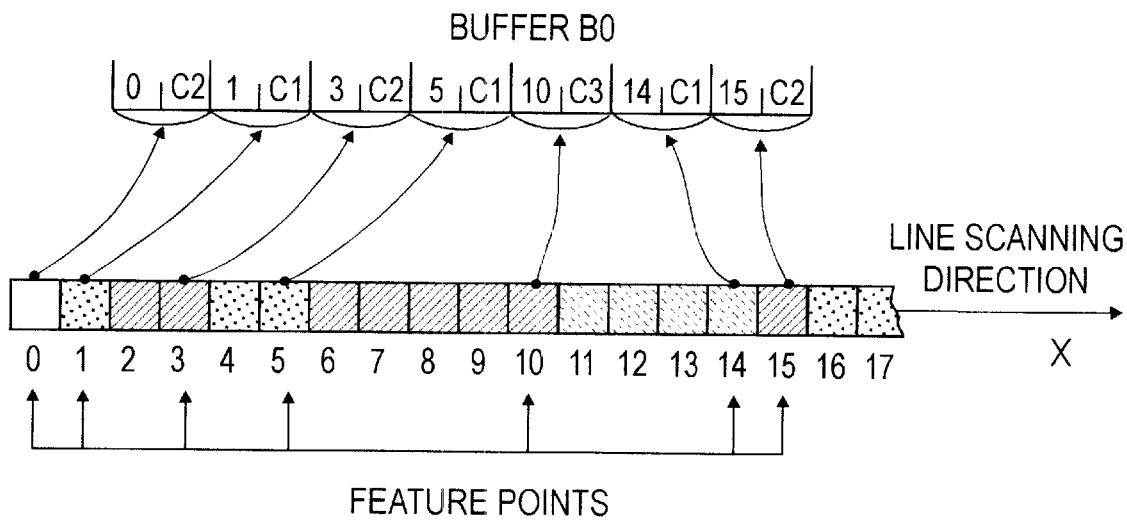
FIG. 4 is a schematic diagram illustrating a process of scanning an image line and forming buffer B0.

FIG. 4 shows a three-color fragment of an image scan line and explains the line scanning process, where different hatching indicates different color of pixels. Color change suffixes C1, C2, and C3 define the color transitions for each detected feature point. The feature point search operation is repeated until the scan line has been completely processed, i.e., all coordinates of feature points in the current scan line have been stored in the memory buffer B0. If no feature points are encountered in the current line, and the memory buffer B1 is empty, then the next successive line is processed in a similar way, incrementing the Y coordinate accordingly, until color transitions are detected.

2)

Next, the boundary matcher analyses the positions and color of feature points encountered in the current scan line relatively to the feature points encountered in the reference scan line by means of pairwise comparing the X coordinates and color change suffixes stored in the buffers B0 and B1. Boundary matching is the key principle for subsequent boundary encoding in accordance with the present invention and will be explained in detail below. It is essentially for this invention that feature points in adjacent lines must pass a predetermined test to be considered matching. The test requirements for matching feature points are met when the feature points can be associated with the same connected boundary, e.g., they define overlapping runs of pixels of the same color.

FIGS. 5A–5F explain the boundary matching principles for adjacent lines utilizing the data of buffers B0 and B1. The boundary matcher/follower 32 of FIG. 3 determines matching and exceptional feature points using a predetermined test including the comparison of coordinates, relative displacements, and corresponding color change suffixes of feature points. In FIGS. 5A–5F, a current line is indicated by 'C' and a reference line is indicated by 'R'.

FIG. 5A illustrates some examples of matching feature points which represent continuous object boundaries. Since every continuous run of pixels in a current scan line can be associated with a contacting or overlapping run of the same-color pixels in a reference scan line, the corresponding feature points of the buffers B0 and B1 which define these runs are considered matching pairwise. Matching feature points are indicated by circles and connected by solid lines.

In a more complex example of matching feature point determination, which will be discussed in detail below, a pair of adjacent feature points in a current scan line can be associated with more than one feature point pair which define contacting or overlapping runs of the same color in a reference scan line, or vise versa. In this case, the two feature points of current scan line are considered matching to a pair of corresponding uttermost feature points of the reference scan line, and vise versa.

Feature points, which are not found matching, are called exceptional. Depending on feature point pattern of the current and reference scan lines, exceptional feature points can indicate termination of an existing object or detection of a new object. A pair of nearby exceptional feature points detected in a current scan line defines a new object. A pair of nearby exceptional feature points on a reference scan line indicates object termination.

FIGS. 5B to 5F illustrate more complex and detailed examples of feature point matching function and explain exceptional feature point detection using concrete pixel combinations in adjacent scan lines. Matching feature points are indicated by circles and connected by solid lines, and exceptional feature points are indicated by crosses in FIGS. 5B–5F. Pixel colors C1, C2, and C3 are referred as in FIG. 4.

Figure 5B:
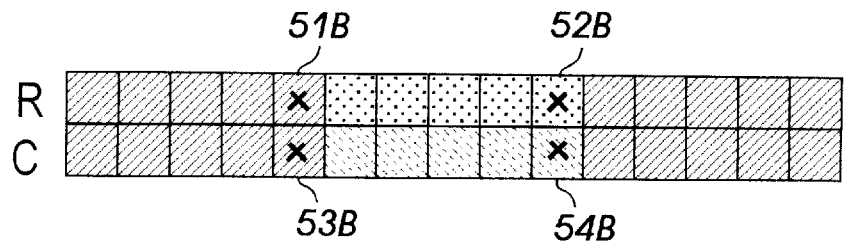

In FIG. 5B, the feature points 51B and 52B in the reference scan line and the feature points 53B and 54B in the current scan line correspond to different-color runs and, therefore, are considered exceptional, despite the feature points 51B and 53B, and 52B and 54B have identical X coordinates pairwise. The exceptional feature points 53B and 54B define a new object, and the exceptional feature points 51B and 52B define a terminating object (object end).

Figure 5C:
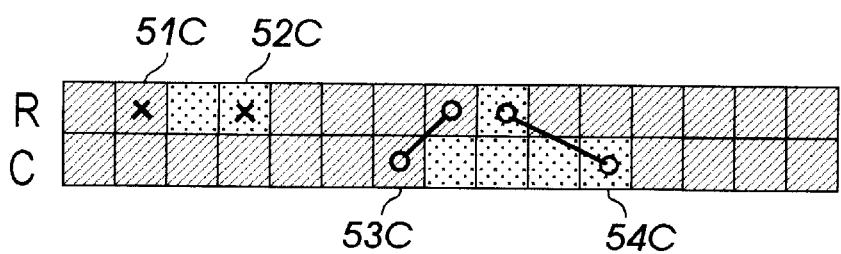

In FIG. 5C, the feature points 51C and 52C in the reference scan line are considered exceptional by the boundary follower/matcher 32 (FIG. 3), since they are more than one pixel apart from the next pair of feature points 53C and 54C indicating the same color transitions in the current scan line. Since the exceptional feature points 51C and 52C indicate terminating feature point sequences, they define an object end.

Figure 5D:
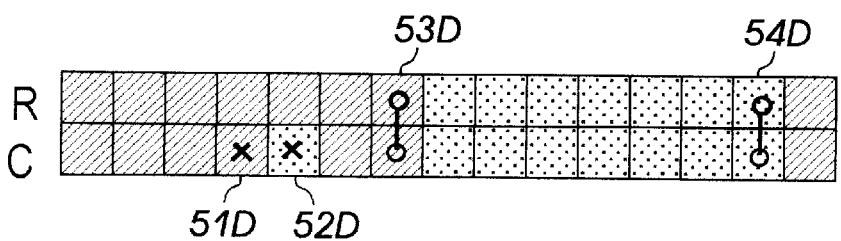

Similarly, in FIG. 5D, since the feature points 51D and 52D detected in the current scan line are isolated (more than one pixel apart) from the next pair of feature points 53D and 54D indicating the same color transitions in the reference scan line, they are considered exceptional. However, unlike the feature points 51C and 52C in FIG. 5C, the feature points 51D and 52D indicate a new object, since they define a pair of new boundaries in the current scan line.

Figure 5E:
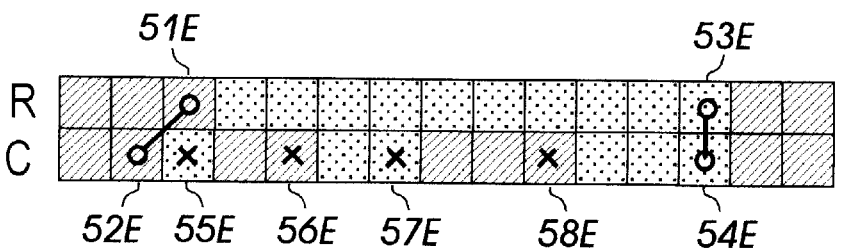

In FIG. 5E, the feature points 51E and 53E in the reference scan line define a continuous pixel run of color C2 which can be associated with three contacting or overlapping runs of the same color in the current scan line (feature points 52E and 55E, 56E and 57E, and 58E and 54E, respectively). In this case, the boundary matcher/follower considers feature points 58E and 53E of the reference scan line matching to the corresponding uttermost feature points 52E and 54E of the current scan line. The inner feature points pairs 55E–56E and 57E–58E of the current scan line are considered exceptional and indicating two new objects of color C1 nested in the object defined by feature points 52E and 54E and having the color C2.

Figure 5F:
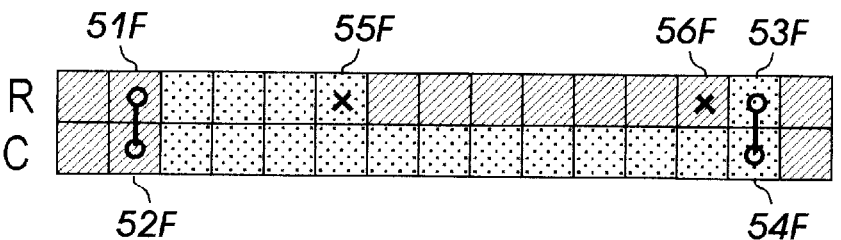

In FIG. 5F, the feature points 52F and 54F defining a C2-color run in the current scan line are considered matching to the uttermost feature points 51F and 53F of four feature points defining two pixel runs of color C2 in the reference scan line. The other two feature points 55F and 56E defining a pixel run of color C1 between a pair of matching feature points 51F and 53F in the reference scan line are considered exceptional and indicating an object end.

As a feature point detected in the current scan line is found matching to a feature point in the reference scan line, the X coordinates of both feature points are passed to the coder, and the data of the buffers B0 and B1 are skipped to the next feature points. In this case, the matching feature point of the current scan line is called "current feature point", the matching feature point of the reference scan line is called "reference feature point". If an exceptional feature point indicating a new object is detected in the current scan line, its coordinate and color code are passed to the coder 33, and the data of the buffer B0 are skipped to the next feature point. If a feature point of the reference scan line is indicating a terminating object, a corresponding object terminating command is sent to the coder 33, and the data in the buffer B1 are skipped to the next feature point. The boundary matching process is repeated until every feature point in the buffers B0 and B1 is processed.

3)

Then, the coder 33 encodes the current scan line by storing new object insertion codes, object termination codes, and boundary following codes. New object insertion codes and object termination codes are respectively used to encode newly detected objects in the current line and objects terminated in the reference line. Boundary following codes are used for connecting each pair of matching feature points by generating a differential chain-link code which represents a relative displacement between matching feature points in the reference scan line and the current scan line. According to the first embodiment, a new code word is appended to the compressed output stream every time as a new feature point in the buffer B0 or buffer B1 is processed.

The coding technique according to the first embodiment will utilize standardized one-dimensional codes (MH) and two-dimensional vertical codes (MR) as described in "STANDARDIZATION OF GROUP 3 FACSIMILE APPARATUS FOR DOCUMENT TRANSMISSION," CCITT Recommendation T.4 (Geneva, 1980), the disclosure of which is hereby incorporated by reference herein in its entirety.

Figure 6:
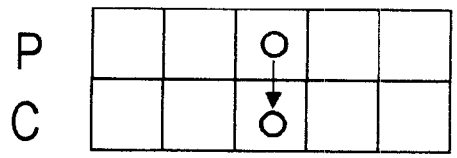
FIG. 6 is a schematic diagram illustrating, by way of example, vertical code generation for matching feature points according to the first embodiment.
Figure 6:
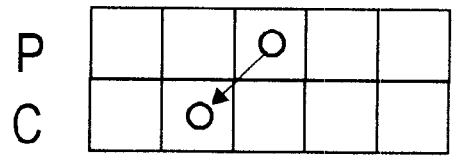
Figure 6:
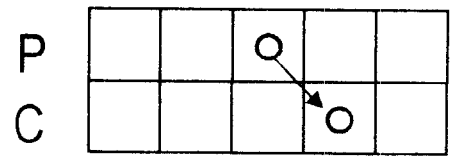
Figure 6:
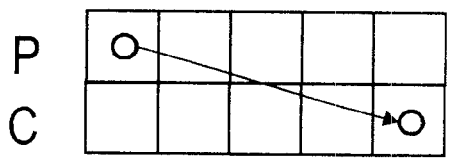
Figure 6:
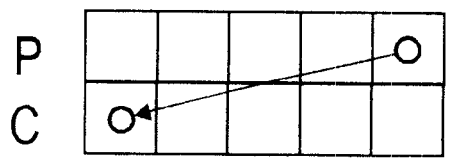

If the coder 33 receives a pair of X coordinates of matching feature points, one coordinate of a reference feature point and the other coordinate of a current feature point, it generates a boundary following code as shown in the Table 1 and illustrated, by example, in FIG. 6. Shift quantities in X coordinate of less than or equal to 3 are encoded using vertical MR codes. However, unlike the MR coding scheme for bitonal images, according to which a pass code is generated for displacements greater than "3" indicating boundary sequence termination and starting a new boundary pair, in this embodiment a corresponding code is assigned to a matching feature point so as to keep tracing a continuous boundary regardless of the displacement quantity. In the first embodiment, the case when X coordinates of matching feature points are identical (no displacement) is considered most probable and encoded with a single bit. Accordingly, all other displacements can be encoded by codewords having bit lengths corresponding to the displacement quantity (see Table 1).

TABLE 1

| Shift Quantity | Code Name | Corresponding Vertical MR Code | Code Word |
|---|---|---|---|
| 0 | P(0) | V(0) | 1 |
| 1 | PR(1) | VR(1) | 011 |
| −1 | PL(1) | VL(1) | 010 |
| 2 | PR(2) | VR(2) | 000011 |
| −2 | PL(2) | VL(2) | 000010 |
| 3 | PR(3) | VR(3) | 0000011 |
| −3 | PL(3) | VL(3) | 0000010 |
| m | PRL(ΔX) | None | 00000011 + MH(m) |
| −m | PLL(ΔX) | None | 00000010 + MH(m) |

In the table 1, the column "Code Name" indicates boundary following code names according to the invention. The code name V(0) indicates a vertical "no change" MR code. The MR code names VR(1) to VR(3) and VL(1) to VL(3) respectively indicate right and left displacements from 1 to 3. A value m under the column "Shift Quantity" indicates a feature point displacement greater than 3. The code MH(m) indicates a horizontal MH code corresponding to a uniform run of m consecutive bits.

It can be seen clearly that boundaries represented by continuous feature points with small displacements in a fine image can be encoded very efficiently, since at most 3 bits per feature point will be used th encode such boundaries of any length.

Codes assigned th exceptional feature points are shown in the Table 2.

TABLE 2

| Meaning of Exceptional Feature Point | Code Name | Corresponding Vertical MR Code | Code Word |
|---|---|---|---|
| New Object | NO | RLPREFIX | 001 + MH(m) + $C_i$ |
| Object End | OE | PASS | 0001 |

If the coder 33 receives an exceptional feature point, it generates a new object insertion code comprising an exception code "001", one-dimensional MH shift code, and a corresponding color change suffix $C_i$ stored in the buffer B0 to indicate the entry position and color of a new object. In the Table 2, a value m in brackets "( )" indicates a difference between X coordinates of the current feature point and an immediately preceding feature point in the current scan line. If there is no preceding feature points in the current scan line, m is considered equal to the X coordinate of the current feature point.

If the coder 33 receives an exceptional feature point indicating an object end, it generates an object termination code comprising an exception code prefix "0001" to indicate bypassing the current exceptional feature point (or a pair of exceptional feature points if the pair indicates termination of a nested object).

The exceptional code prefixes for new object insertion and object termination correspond to the horizontal mode code and the pass code in the MR coding scheme, respectively. However, in the present invention, the NO and OE codes have essentially different meanings, namely, registering a new continuous feature point sequence and termination of such an existing sequence.

Those skilled in the art will appreciate that in case of line-to-line continuity of feature points the number of bits needed to represent a particular scan line will not depend on the image color depth, since a color change suffix is inserted for a continuous boundary only once, and no code related to color information is generated for the subsequent feature points defining the boundary. Thus, the quantity of information needed to encode the image can be essentially reduced as compared to the conventional techniques involving the color of each pixel into analysis.

Then, as a relevant code is generated, the coder 33 executes the above procedures until every feature point in the current and reference scan lines is processed and all boundary following, new object insertion, and object termination codes representing the current line are sent to the output stream.

4)

As the current line is processed, the data of buffer B0 are transferred to the buffer B1 (replacing the previous content of the buffer B1), so that the new processed line will serve as a reference line, and the buffer B0 and X coordinate are then reinitialized to zero.

The steps 1 to 4 are then repeated until the image end. As subsequent scan line data are piped into the buffer B0, the previous scan line data are transferred into the buffer B1. Each pair of adjacent scan lines is further monitored for the position and color of edge-to-edge transitions, and is in turn compared in position and color change for continuation of object boundaries. Each object boundary, regardless of length, can be encoded by chain-linked codes representing successive moves along the continuous feature point sequence.

So, as it can be apparent to those skilled in the art, the image coding scheme of the first embodiment, as disclosed above, uses some known techniques, such as MH coding and MR vertical code generation. In particular, the MH codes are used for starting a new boundary or encoding long displacements, and the MR vertical codes are used for the case when matching feature points on a reference scan line and a previous reference scan line are within three pixels from each other. However, in contrast to known facsimile transmission or document imaging equipment utilizing the two-dimensional coding technique, the method and apparatus in accordance with the first embodiment of the invention can encode multi-value images of arbitrary color depth. It also further compresses image data for a scan line by forming a sequence of vertical codes using matching feature points in the adjacent scan lines, regardless of the displacement quantity. The key feature of the invention resides in selection of matching feature points for the image data representative of the current scan line to be stored or transmitted. Each continuous boundary segment is treated as a separate thread which, however, typically has a pair closing thread. The invention according to the first embodiment lies in introducing the color change suffixes indicating color transitions in a scan line, sequential tracing the continuous boundaries, substitution of vertical codes, and how the vertical mode code is substituted.

Second Embodiment

Figure 7A:
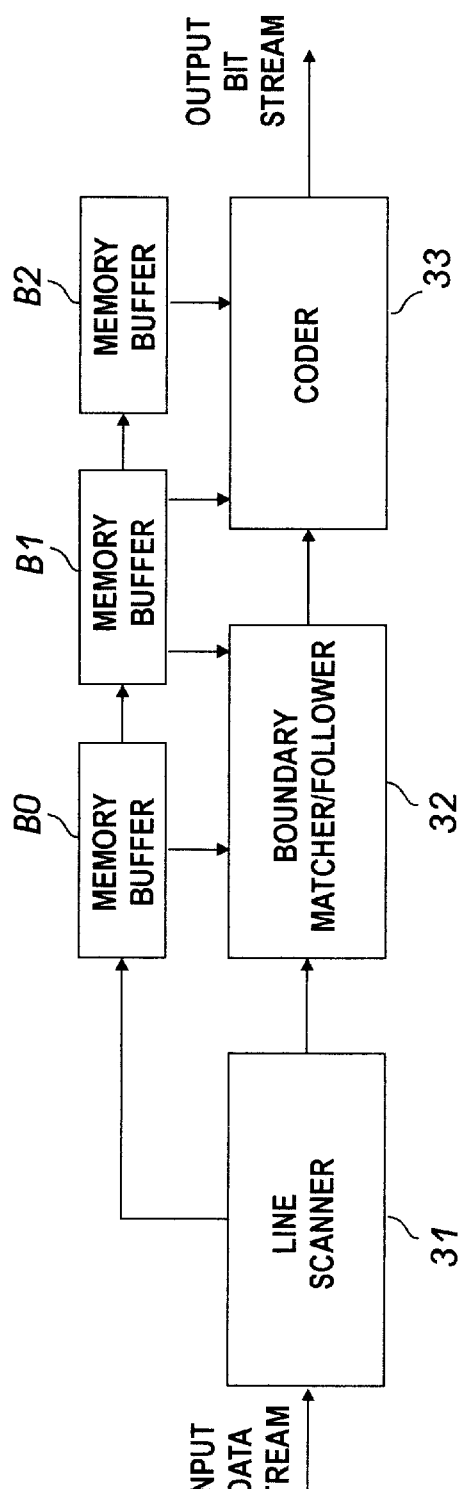
FIGS. 7A and 7B are block diagrams showing an image coding apparatus in accordance with the second embodiment.
Figure 7B:
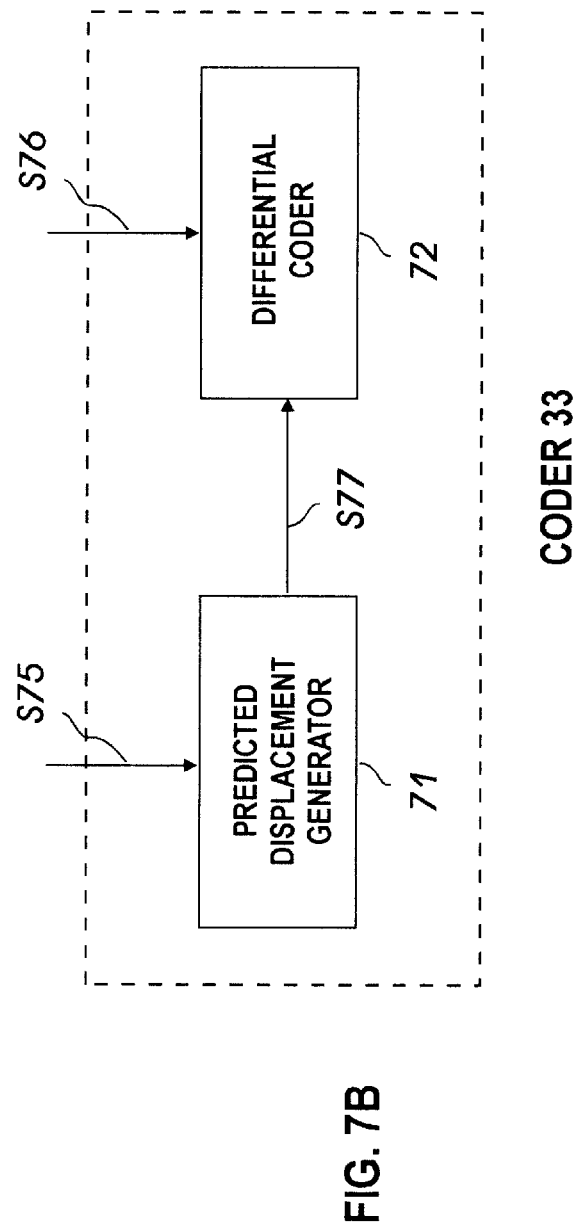

In the second embodiment (FIGS. 7A and 7B), the encoding process described above is further enhanced by introducing an additional line memory buffer B2 and adding a predictive coding circuit comprising a predicted displacement generator 71 and a differential coder 72 to the coder 33. Like numerals in each FIG. 3 and FIG. 7A refer to like parts.

The buffer B2 is set to zero at the beginning of coding and is designated for storing feature point positions and colors for a second preceding line (called 'previous reference line') of the line to be coded. According to the second embodiment, the coder 33 will encode successive moves along the matching feature points using the information on an immediately preceding move for a given feature point sequence and predictive coding.

As an image line is scanned and feature points are identified in accordance with steps 1 and 2 of the first embodiment, at the next step, the predicted displacement generator 71 (FIG. 7A) receives input signal S75 from the boundary matcher/follower 32 and generates a predicted move signal S77 for a current matching feature point of the buffer B0. The differential coder 72 compares the data of a predicted move signal S77 with the current feature point data of an input signal S76 and generates a boundary following code which represents a prediction error for the current displacement.

In this embodiment, if the coder 33 receives a matching coordinate pair, it analyses the difference between X coordinates of these two feature points, called observed displacement. It also calculates a predicted move along the corresponding feature point line based on previous move information which is obtained by comparing the immediately preceding feature point positions stored in the buffers B1 and B2. The coder 33 generates boundary following codes taking into account the inclination changes and relative pixel displacements, and using predictive coding.

According to the second embodiment, predictive coding means assigning a shorter codeword to a feature point displacement corresponding to a lesser prediction error calculated using a previous observed displacement between matching (i.e., associated with the same boundary) feature points in the reference scan line and the previous reference scan line. Predictive coding exploits stochastic displacement correlation between the matching feature points. In other words, smaller differences in prediction error between successive moves along the continuous boundary lines are considered having higher probability and are encoded using a smaller number of bits. In particular, most cases where the position of a matching feature point in the current scan line and the predicted position of this feature point are identical (no prediction error) can be encoded using only a single bit. Accordingly, all other cases of matching feature points can be encoded by codewords having bit lengths corresponding to the prediction error.

Figure 8A:
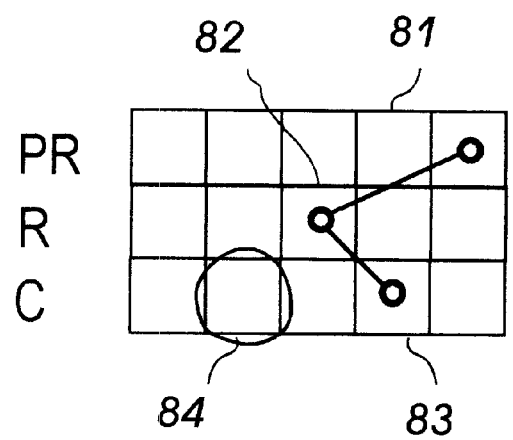
FIGS. 8A–8C are schematic diagrams illustrating, by way of example, vertical code generation according to the second embodiment.

FIG. 8A schematically illustrates the predictive coding principle according to the second embodiment. As shown in FIG. 8A, predictive coding utilizes positional information of continuous matching feature points on the current, reference, and previous reference (indicated as PR) scan lines. The corresponding feature point of the previous reference line is called "previous reference feature point". The coordinates of the previous reference feature point 81 and the reference feature point 82 are used to estimate a predicted position of the current feature point 83. The predicted current feature point 84 (encircled square) represents the expected displacement of the matching feature point 83 for a given pair of the previous reference feature point 81 and the reference feature point 82.

If a reference feature point and a previous reference feature point have identical X-coordinates, i.e. belong to a vertical boundary segment, or a reference feature point has no matching previous reference feature point, the boundary following and exception codes are generated according to the first embodiment (symmetric code). If there is any displacement of matching feature points between the reference and previous reference scan lines, the current feature point transition is encoded using asymmetric code assignment based on predictive coding.

Figure 8B:
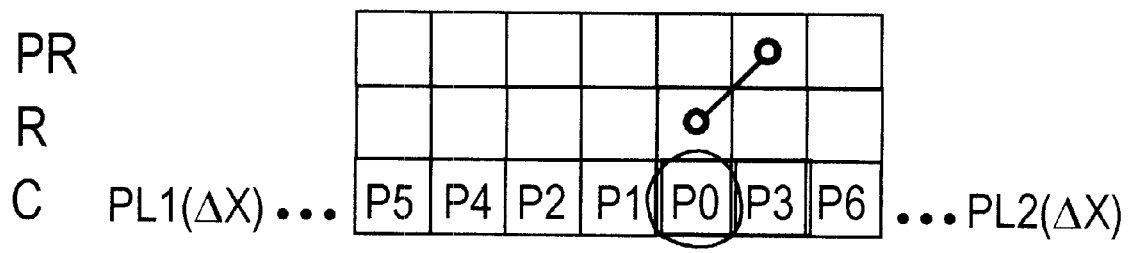

FIG. 8B shows an example of asymmetric assignment of boundary following codes P0 to P6 and PL1($\Delta$X) to PL4($\Delta$X) depending on the relative displacement of a current feature point for the case when a previous reference feature point is one pixel apart from a previous reference feature point. The corresponding bit representations of the codes are listed in the Table 3, in which MH($\Delta$X) indicates the MH code corresponding to a difference between X coordinates of a current feature point and a corresponding reference feature point.

TABLE 3

| Code Name | Code Word |
| --- | --- |
| P0 | 1 |
| P1 | 01 |
| P2 | 001 |
| P3 | 000001 |
| P4 | 0000001 |
| P5 | 00000001 |
| P6 | 000000001 |
| P7 | 0000000001 |
| PL1($\Delta$X) | 0000000001 + MH($\Delta$X) + $C_i$ |
| PL2($\Delta$X) | 00000000001 + MH($\Delta$X) + $C_i$ |
| PL3($\Delta$X) | 00000001 + MH($\Delta$X) + $C_i$ |
| PL4($\Delta$X) | 000000000001 + MH($\Delta$X) + $C_i$ |
| NO | 0001 |
| OE | 00001 |

Figure 8C:
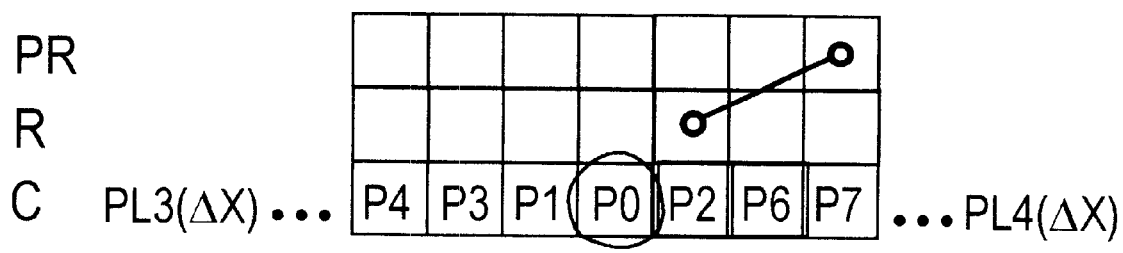

FIG. 8C shows an example of boundary following code assignment for the case when a previous reference feature point is more than one pixel apart from a previous reference feature point. The shortest codeword P0 is assigned to a current feature point which corresponds to a predicted move. Successive moves of the same sign are considered more probable and encoded with least numbers of bits. Moves with sharp changes in inclination are considered hardly probable and encoded with longer codewords.

In a general image signal, the probability that feature points defining continuous boundary lines will maintain the transition quantities nearly constant between many consequent lines is higher that the probability that feature points will frequently change the transition quantity and sign from line to line. Therefore, asymmetric assignment of shorter codewords to feature point displacements having higher probabilities will reduce the quantity of information needed to represent the image signal compared with the symmetric case where boundary following codes for left and right feature point displacements of equal quantity are composed of an equal number of bits.

If the coder receives a pair of feature point coordinates indicating detection of a new object or termination of an existing object, it generates NO or OE codes, respectively, as shown in the Table 3.

The step 4 of encoding procedure is similar to that of the first embodiment with the following difference: when a next line is processed, the buffers reinitializing starts with piping the data from the buffer B1 to the buffer B2.

Third Embodiment

The third embodiment implements tracing and coding the whole object boundaries first and then storing them in the output stream in a chain-link code together with their initial position and color information. Each object is encoded independently of each other and output as a single contour closing upon itself (see FIG. 1B). By this embodiment, the feature point detection and matching techniques are similar to those of steps 1 and 2 of the first embodiment. However, at the next step, the detected feature points are used to update the associated object boundaries which are output to the compressed bit stream after their being completely encircled. Each successive transition of matching feature points is encoded as a differential code representing a set of elementary moves along the corresponding boundaries rather than a single line-to-line feature point displacement. The codeword representing each move is formed using the slope information of an immediately preceding move and predictive coding.

Figure 9A:
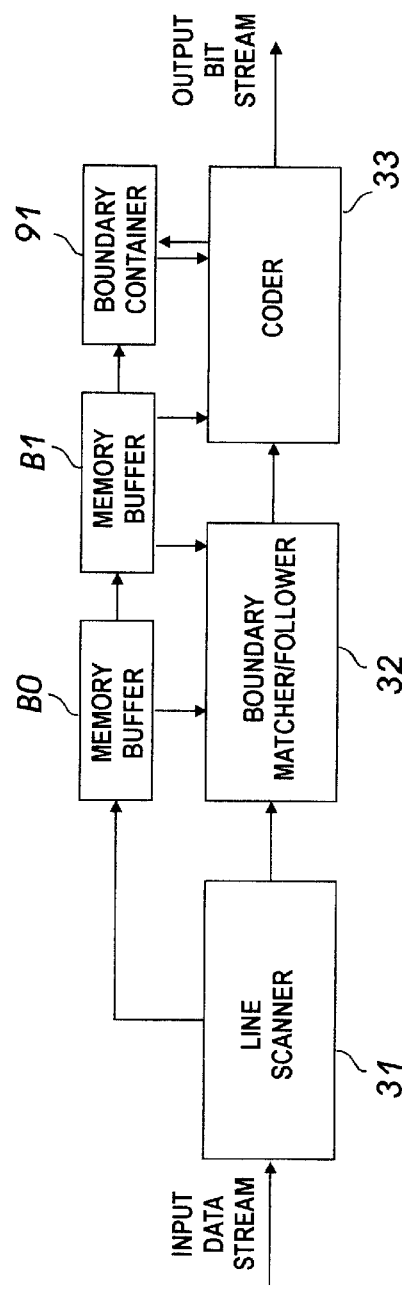
FIGS. 9A and 9B are block diagrams showing an image coding apparatus in accordance with the third embodiment.
Figure 9B:
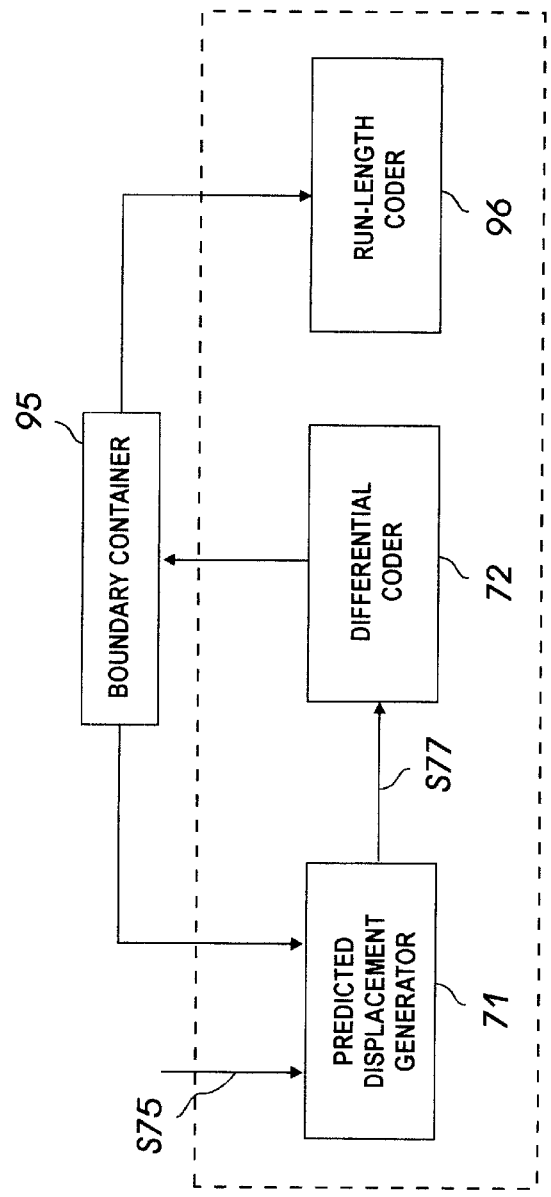

FIGS. 9A and 9B show a schematic representation of the embodiment. To enable boundary recording, a new memory buffer 95 called 'boundary container', which replaces the buffer B2 of the second embodiment, is introduced (FIG. 9A). The boundary container 95 will temporarily store partial object boundaries before the boundaries will be completed and sent to the compressed output stream. Each boundary comprising boundary entry coordinates X and Y (the point coordinates where the boundary was first detected), color change suffixes $C_i$, and sequential direction codes (see FIG. 10) will be encoded independently as a separate thread having, however, a pair closing thread. Each independent thread of chain codes in the boundary container 95 is hereby associated with a continuous sequence of matching feature points.

In FIG. 11A given as an example, the outline boundary of the object 111 can be traced on the line-by-line basis using a pair of boundary threads 113 and 114 each of which includes the coordinates of entry point 112 (shown encircled), a corresponding color change suffix, and a series of elementary moves (indicated by arrows) determined by matching feature points on consecutive scan lines.

As each new matching feature point is detected in a current line, a boundary connecting code is appended to a corresponding thread in the boundary container 95. As each new feature point indicating a new object is detected, a pair of new threads originating from a single starting point is inserted in the boundary container 95 at the position which corresponds to the insertion position of the associated feature point in the buffer B0. As a new feature point indicating termination of a completely encircled object is detected, the corresponding thread is joined with its closing pair, thus recovering a full boundary, and sent to the output stream, and the pair of threads is deleted from the boundary container 95.

The encoding method for a boundary thread segment corresponding to a pair of matching feature points is described below.

FIG. 11B illustrates generation of sequences of elementary moves for connection of matching feature points. In FIG. 11B, an observed displacement of matching feature points 115 and 116 is traced by the boundary matcher/follower 32 using three elementary moves running along the actual boundary line. Matching feature points 117 and 118 are connected with a single move. Each connecting elementary move is encoded and appended to a corresponding boundary thread.

To implement an efficient coding technique which will use predictive coding for further improving the compression of successive moves along the boundary lines, the predicted displacement generator 71 (see FIG. 9B) uses a change in relative inclination for the current move in comparison with a linearly predicted move based on a previous successful move on the same boundary. The differential coder 72 encodes every elementary move according to the prediction error relatively to an immediately preceding move.

It is obvious that each successive move can be described using the eight possible directions (see FIG. 12A) arranged at intervals of 45° and encoded using a three-bit codeword. However, as the probability of smaller relative inclination is generally higher than the probability of larger inclination in the boundary transition, in this embodiment, the differential coder 72 assigns shorter codewords to smaller inclination changes and longer codewords to larger changes. For example, if there is no difference between a direction to be coded and a previous direction (a linearly predicted move), one-bit codeword '1' is generated.

Figures 12A, 12B:
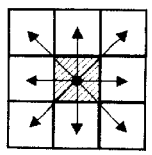
FIG. 12A is a schematic diagram showing possible moves (elementary displacements) for a pixel-to-pixel transition along a boundary line.
FIG. 12B is a diagram illustrating directional code generation using previous move information in accordance with the third embodiment.

FIG. 12B shows an example of codeword assignment based on the prediction error quantity for a pair of successive moves in accordance with the third embodiment. This procedure is performed every time when an elementary move is appended to an active boundary thread.

When a pair of adjacent boundary threads corresponding to the same object is found to be terminating at a certain line (see FIGS. 13A and 13B), the boundary matcher/follower 32 joins these threads to form a single continuous thread. Threads stored in the boundary container are verified for their being closing an object by comparing their entry coordinates stored at the beginning of each thread. Identical coordinates for a pair of terminating threads indicate that an object is completely encircled.

Figure 13A:
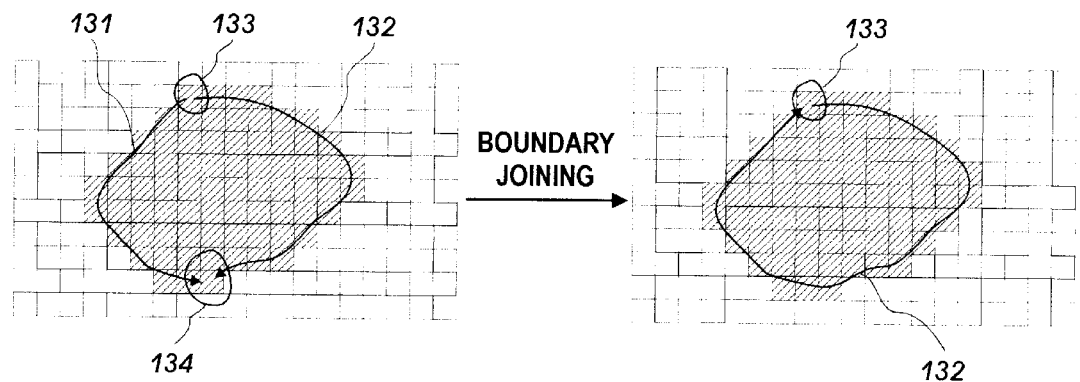
FIGS. 13A and 13B are schematic diagrams illustrating, by way of example, joining the pairs of terminating boundaries in accordance with the third embodiment.
Figure 13B:
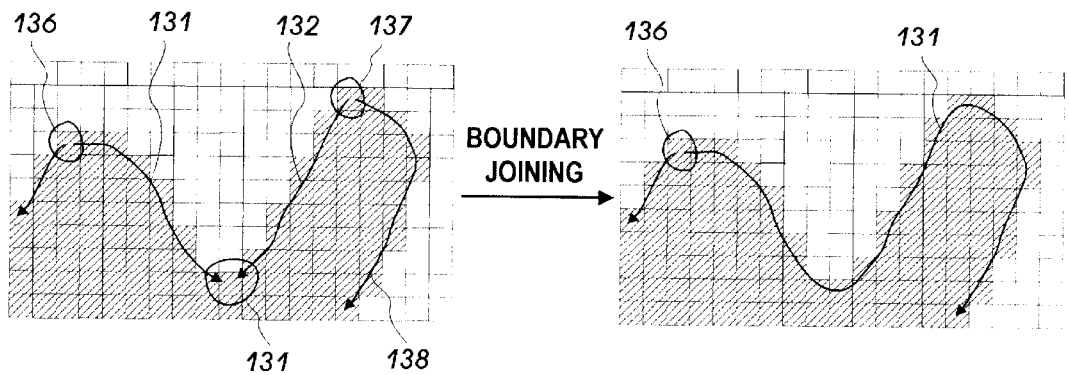

For example, in FIG. 13A, terminating threads 131 and 132 are characterized by the same entry point 133. In this case, the threads are joined at their converging point 134, so that the direction codes of the left thread are added to the right thread in the reverse order, and the right thread becomes a closed boundary. Then the right updated thread 132 is sent to the compressed output stream, after which the pair of threads is deleted from the boundary container.

In another example, terminating threads 131 and 132 have different entry points 136 and 137 (FIG. 13B), thus indicating that the boundary threads represent separate segments of not yet encircled object. In this case, the right thread 132 is appended to the end of the left thread 131 in the reverse order, and a closing pair 138 of the right thread 132 is appended to the end of the resulting thread. After this, only the donor threads 132 and 138 are deleted from the boundary container and nothing is sent to the compressed output stream.

In other words, the above process using the data of the line memory buffers B0 and B1 and the boundary container updates a continuous boundary thread by adding a new prediction-encoded move or appending an adjacent thread every time when a corresponding matching feature point is found in the current line. Boundary matching/following and new or terminating boundary detection is performed using the buffers B0 and B1. The boundary container 95 is merely used for elementary move encoding. When a thread is found to be closing an object, it is sent to the output stream and deleted from the boundary container.

As a result, when a boundary is closed, its record is formed in the boundary container as a pair of entry coordinates followed by a corresponding color suffix, and a chain-linked sequence of encoded moves encircling the boundary line in the clockwise direction (FIG. 10). As each new object boundary is completely processed, its corresponding record is sent to the output stream. When a new feature point pair indicated a new object is detected in the current scan line, a pair or threads is inserted in the boundary container at the proper position. The process continues until the image end, thus forming a compressed output bit stream, where the objects are stored sequentially boundary by boundary, each starting with positional and color information.

Image Decoding

The decoding process for all described embodiments is performed using the same steps as in encoding but in the reverse order. The compressed data is decoded using a system (not shown) which is the inverse of the encoder shown in FIGS. 3, 7 and 9 for the respective embodiments. The contents of buffers B0, B1 and, if applicable, buffer B2 or boundary container 95 are formed from the compressed stream on the line-by-line basis and used to determine boundary transitions and feature points for each successive line. The decoding circuit takes object entry coordinates and corresponding color information to restore object entry points. Then, the decoding circuit takes chain link codes and as the boundary positions of a next line are restored, the decoder alternately fills the gaps between the boundaries with runs of pixels of a corresponding color, thus completely decoding the image line. This procedure is repeated until the original image is restored.

Other Embodiments

In accordance with the aforementioned embodiments, the present invention comprises coding the color or gray-tone images by employing a process for encoding object boundaries together with corresponding color information. However, this invention is not only limited to this, but can be applied to the case where an input image signal is represented by a plurality of regions characterized by different attribute, pattern, or any other characteristics, such as image regions selectively containing text or graphics.

Alternatively, a multicolor input image can be encoded with the method disclosed in the present invention after preliminary dividing the image into a plurality of bands or processing with the so-called Gray-coding procedure. This method will efficiently encode images having extended regions with uniform colors or gray-scale tones.

When necessary, i.e. in case of implementing the present invention in facsimile transmission, "end-of-line" (EOF) codes can be inserted in the output stream formed according to the first and second embodiments to explicitly indicate line ends of the image.

Despite the coding procedure according to the third embodiment uses a pair of X and Y coordinates to store the boundary entry positions in the output stream, only one positional coordinate can be used. For example, positions of boundary entry pixels can be encoded using MH-encoded numbers of successive image pixels between a current boundary entry pixel position and a previous boundary entry pixel position.

As an information redundancy can still be present in the output stream after applying the foregoing procedures, a subsequent known compression procedure can be applied as to the stream in the whole as to any subsequence which forms the output for an additional gain in compression. For example, boundary entry coordinates and sequences of directional moves can be passed to separate standard coding procedures.

The foregoing embodiments are described upon the case when predictive coding uses an immediately preceding feature point or boundary pixel to encode a current feature point or elementary move along the boundary line. However, this invention is not only limited to this, but can be applied to the case where probabilities of a next feature point displacement or elementary move are calculated using two and more preceding feature points or elementary moves. In addition, this invention is not limited to the case where the linear prediction of a next feature point or elementary move is used. Instead, or in addition to, it can implement other known prediction techniques. This invention can also be applied to the case where stochastic correlations of feature points or successive elementary moves can be determined using the preliminary image scanning or preprocessing, and prediction error codes can be assigned accordingly. For example, polynomial extrapolation based on preceding moves can be used to predict a next move direction.

In accordance with the third embodiment, the invention comprises sequential coding the elementary moves along the boundary lines. However, the invention is not only limited to this, but can be applied to the case where a code fragment representing a sequence of elementary moves is replaced by another code fragment representing a sequence of elementary moves resembling the sequence being replaced but composed of a smaller number of bits. For example, in the case of scanned text input, each of a plurality of sequences of detected elementary moves representing a partial or complete boundary of a frequently occurring character can be replaced by an "error-free" sequence representing the same character boundary.

No further details will be given as to how output stream information can be further compressed or converted into a device-specific information for subsequent use since such does not form part of the present invention which is concerned with the encoding of raster images by means of efficient coding the boundaries representing the image content.

Conclusion, Ramifications, and Scope

Accordingly, the reader will see that the on-the-fly image coding method and apparatus of this invention can be used to efficiently encode a variety of images, which can be represented by a set of uniform-attribute regions, using a small amount of memory and a minimum redundancy code. In an exemplary case, when an input image signal is represented by only one bit, such as black and white scanned text or facsimile document, color change information is limited to only black to white and white to black transitions which occur alternately. Therefore, the use of color change suffixes $C_i$ in the memory buffers B0–B2 and the output stream can be eliminated, thus improving the compression efficiency.

The foregoing description is offered primarily for purposes of illustration. Disclosed in this invention is a simple idea of encoding the continuous object boundaries in sequential manner. The encoding is performed on the line-by-line basis applying feature point detection and matching technique for each scan line. The invention eliminates the need to store image blocks in the memory that leads to a further reduction of the storage memory and time for image encoding.

As the operation principles of the disclosed invention allow to encode images in the scanning-line mode, the technique is applicable to the real time image processing systems, video communication, document imaging and sending imagery applications (e.g., facsimile transmission). The approach allows sequential on-the-fly encoding of images of virtually any size, while consuming small amount of RAM memory and operating in a computationally inexpensive way utilizing mathematical logic rather than arithmetic operations whenever possible. There is also no need for floating-point operation enabled software and hardware for implementing this technique. The method can be promisingly efficient for high-resolution color image recording and mapping when combined with the pattern recognition and edge detection techniques.

According to the third embodiment of the invention, the disclosed on-the-fly extraction of object boundaries combined with simultaneous compaction of the boundaries can be regarded as a convenient and effective technique for image vectorization which can be useful for further object-based image data retrieval and manipulation. The technique has the advantage that each item of compressed data relates to a single object and therefore each object can be selectively extracted or electronically manipulated, for example rotated, while in compressed form.

While a variety of embodiments has been disclosed, it will be readily apparent to those skilled in the art that numerous modifications and variations not mentioned above can still be made without departing from the spirit and scope of the invention.

I claim:

1. An apparatus for coding image data for data compression, said image data represented by digital input pixel data and accessible as successive input scan lines, said apparatus comprising:

detecting means for detecting a plurality of feature points on a scan line of said image data, said feature points expressing boundary positions at which a predetermined characteristic of image pixels changes;

a run-data memory for storing said boundary positions for at least two consecutive pluralities of said feature points;

matching means coupled to said detecting means and said run-data memory for judging, according to a boundary continuity test, whether or not a feature point on said scan line is matching to a feature point on a scan line which precedes said scan line; and coding means coupled to said matching means for differential coding a position of said feature point as a function of at least one of positions of preceding feature points, said feature point and said preceding feature points defining a continuous sequence of matching feature points, whereby said image data is efficiently encoded on the fly utilizing a small amount of memory and computing resources.

2. The apparatus of claim 1 wherein said coding means encodes said position of said feature point as a function of a relative displacement between said feature point and immediately preceding said matching feature point into a differential code.

3. The apparatus of claim 2 wherein said differential code for said relative displacement of less than or equal to a predetermined value is a vertical code of a MR coding scheme, and said differential code for said displacement of more than a predetermined value is a code comprising a runlength code of a MH coding scheme.

4. The apparatus of claim 1 further comprising predicting means for estimating a predicted position of said feature point on said scan line based on positions of a plurality of preceding said matching feature points, and wherein said coding means generates a differential code as a function of a prediction error.

5. The apparatus of claim 4 further comprising runlenth coding means for runlength coding said differential code.

6. An apparatus for coding image data for data compression, said image data defining raster objects in an image and being accessible as successive input scan lines, said apparatus comprising:

detecting means for detecting a plurality of feature points on a scan line of said image data, said feature points expressing boundary positions at which a predetermined characteristic of image pixels changes;

a run-data memory for storing said boundary positions for at least two consecutive pluralities of said feature points;

matching means coupled to said detecting means and said run-data memory for judging, according to a boundary continuity test, whether or not a feature point on said scan line is matching a feature point on a scan line which precedes said scan line;

boundary following means coupled to said matching means for generating a sequence of elementary displacements connecting matching feature points;

a vector data memory for temporary storing at least one said sequence; and coding means coupled to said boundary following means and said vector data memory for differential coding each of said elementary displacements, said coding means comprising predicting means for estimating a predicted elementary displacement based on at least one preceding elementary displacement defining said sequence and generating a differential code as a function of a prediction error, whereby said image data is efficiently encoded as a plurality of object boundaries detected and compressed simultaneously on a line by line basis.

7. The apparatus of claim 6 wherein said vector data is a vector comprising an entry coordinate, a color code, and a chain code for a plurality of said elementary displacements defining said object boundary.

8. The apparatus of claim 6 further comprising secondary coding means for additional coding said differential code.

9. The apparatus of claims 6 further comprising code substituting means for replacing a fragment of said differential code with a substitution code, said substitution code being composed of a smaller number of bits than said fragment of said differential code.

10. A method of coding image data for data compression, said image data represented by digital input pixel data and accessible as successive input scan lines, said method comprising the steps of:

detecting a plurality of said feature points on a scan line of said image data and storing said feature points in a run-data memory, said feature points expressing boundary positions at which a predetermined characteristic of image pixels changes;

judging, according to a boundary continuity test, whether or not a feature point on said scan line is matching to a feature point on a scan line which precedes said scan line; and differential coding a position of said feature point as a function of at least one of positions of preceding feature points, said feature point and said preceding feature points defining a continuous sequence of matching feature points.

11. The method according to claim 10 wherein said position of said feature point is encoded as a function of a relative displacement between said feature point and immediately preceding said matching feature point into a differential code.

12. The method according to claim 11 wherein said differential code for said relative displacement of less than or equal to a predetermined value is a vertical code of a MR coding scheme, and said differential code for said displacement of more than said predetermined value is a code comprising a runlength code of a MH coding scheme.

13. The method according to claim 10 further comprising a step of estimating a predicted position of said feature point on said scan line based on positions of a plurality of preceding said matching feature points, and wherein said position of said feature point is encoded as a function of a prediction error.

14. The method according to claim 13 wherein said differential coding step further comprises a runlength coding step to further enhance the compression of said image data.

15. A method of coding image data for data compression, said image data defining raster objects in an image and being accessible as successive input scan lines, said method comprising the steps of:

detecting a plurality of said feature points on a scan line of said image data, said feature points expressing boundary positions at which a predetermined characteristic of image pixels changes;

judging, according to a boundary continuity test, whether or not a feature point on said scan line is matching to a feature point on a scan line which precedes said scan line;

generating a sequence of elementary displacements connecting matching feature points to form a continuous object boundary; and differential coding each of said elementary displacements comprising a predicting step for estimating a predicted elementary displacement based on at least one preceding elementary displacement defining said sequence and generating a differential code as a function of a prediction error.

16. The method according to claim 15 wherein said vector data is a vector comprising an entry coordinate, a color code, and a chain code for a plurality of said elementary displacements defining said object boundary.

17. The method according to claim 15 further comprising a step of runlenth coding for runlength coding said vector data.

18. The method according to claim 15 further comprising a code substituting step for replacing a fragment of said differential code with a substitution code, said substitution code being composed of a smaller number of bits than said fragment of said differential code.

19. The apparatus of claim 1 wherein said predetermined characteristic is selected from the group consisting of black and white binary code, gray scale value, color, pattern, and pixel intensity.

20. The apparatus of claim 1 wherein said run-data memory further comprises means for storing a color transition code for each of said feature points.

* * * * *